United States Patent
Brown

(10) Patent No.: US 7,076,510 B2
(45) Date of Patent: Jul. 11, 2006

(54) SOFTWARE RAID METHODS AND APPARATUSES INCLUDING SERVER USAGE BASED WRITE DELEGATION

(76) Inventor: William P. Brown, 15431 SE. 42nd St., Bellevue, WA (US) 98006

( * ) Notice: Subject to any disclaimer, the term of this patent is extended or adjusted under 35 U.S.C. 154(b) by 696 days.

(21) Appl. No.: 10/194,197

(22) Filed: Jul. 12, 2002

(65) Prior Publication Data

US 2003/0014598 A1  Jan. 16, 2003

Related U.S. Application Data

(60) Provisional application No. 60/305,282, filed on Jul. 12, 2001.

(51) Int. Cl.
*G06F 12/00* (2006.01)
(52) U.S. Cl. .......................... 707/203; 707/8; 707/201; 711/114; 711/143
(58) Field of Classification Search ................. 711/152
See application file for complete search history.

(56) References Cited

U.S. PATENT DOCUMENTS

| | | | |
|---|---|---|---|
| 5,813,016 A | * | 9/1998 | Sumimoto .................. 707/201 |
| 5,937,428 A | * | 8/1999 | Jantz .......................... 711/114 |
| 6,026,401 A | * | 2/2000 | Brealey et al. ................. 707/8 |
| 6,073,218 A | | 6/2000 | DeKoning et al. |
| 6,108,684 A | | 8/2000 | DeKoning et al. |
| 6,148,414 A | | 11/2000 | Brown et al. |
| 6,185,601 B1 | * | 2/2001 | Wolff .......................... 709/203 |
| 6,272,491 B1 | * | 8/2001 | Chan et al. ..................... 707/8 |
| 6,353,836 B1 | * | 3/2002 | Bamford et al. ............. 707/203 |
| 2002/0099729 A1 | * | 7/2002 | Chandrasekaran et al. .. 707/203 |
| 2002/0124137 A1 | * | 9/2002 | Ulrich et al. ................. 711/113 |
| 2002/0184216 A1 | * | 12/2002 | Chandrasekaran et al. ..... 707/8 |
| 2003/0177322 A1 | * | 9/2003 | Crockett et al. ............. 711/161 |

\* cited by examiner

*Primary Examiner*—Mano Padmanabhan
*Assistant Examiner*—Kaushikkumar Patel

(57) ABSTRACT

At least a first and a second server of a cluster of servers are equipped with complementary software RAID drivers and distributed lock managers to enable the first server to delegate to the second server, writing of a version of a unit of coherent data into a number of storage devices coupled to the server cluster. The drivers and lock managers are designed to enable the first server to determine the second server as an appropriate current synchronization server target, which determination includes consideration of the last synchronization server target. If the last synchronization server target is not the appropriate current synchronization server target, the second server is selected among the "eligible" servers of the cluster. The consideration/selection may be based on the usage state of the candidate server.

28 Claims, 8 Drawing Sheets

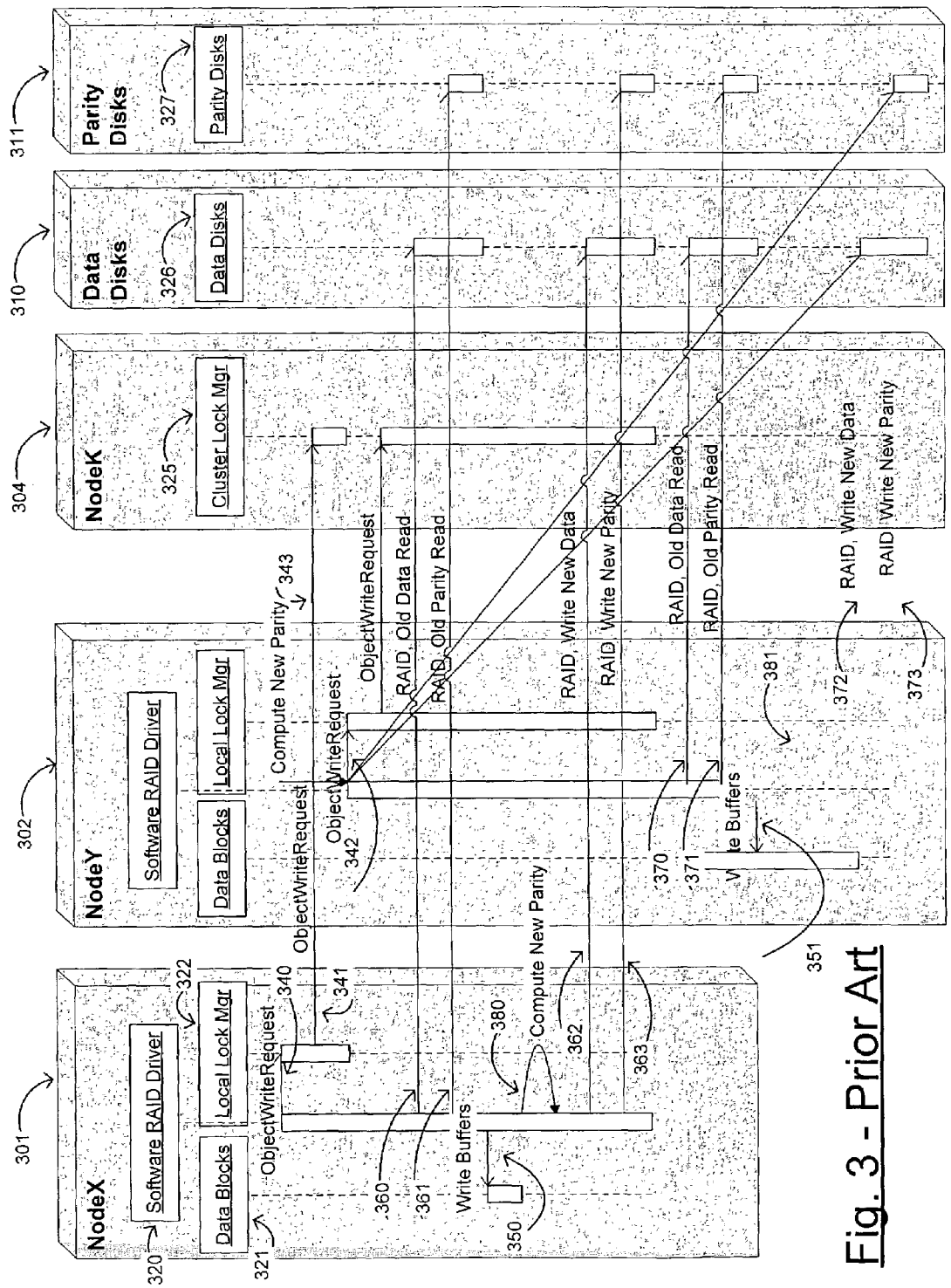
Fig. 3 – Prior Art

SOFTWARE RAID METHODS AND APPARATUSES INCLUDING SERVER USAGE BASED WRITE DELEGATION

RELATED APPLICATION

This application is a non-provisional application of provisional application No. 06/305,282, filed on Jul. 12, 2001. This application claims priority to the filing date of the '282 provisional application, and incorporates its specification hereby in totality by reference.

FIELD OF THE INVENTION

The present invention relates to the field of data processing. More specifically, the present invention is related to software RAID (Redundant Array of Independent Disk).

BACKGROUND OF THE INVENTION

RAID, which stands for Redundant Array of Independent Disks, is a technology for providing fault tolerance to a computer data storage subsystem. RAID systems are commonly attached to computing systems to allow them to survive a storage device failure. For a detailed description of RAID technology see the RAID advisory boards (RAB) handbook on System Storage Technology 6$^{th}$ edition.

A volume manager is a tool for managing the storage resources of the computing system. Volume managers are primarily used to organize storage devices into logical volumes, which may span multiple storage devices, or to logically divide up storage devices into one or more logical volumes.

RAID capability can be implemented in a dedicated HW device, known as a RAID controller, or it can be implemented as server resident driver level software, commonly known as Software RAID. Software RAID is often integrated into a volume manager.

Recently there has been research into the development and application of distributed RAID algorithms. Distributed RAID allows a cluster of controllers or hosts to directly share access to disk drives while maintaining RAID functionality. If any node in the cluster fails, the surviving nodes can continue accessing the RAID protected disk drives.

Most large-scale information systems use dedicated hardware based RAID controllers because they offer greater performance than software based RAID. This is because software RAID requires parity computations to be executed by the server's CPU, thus taking compute power away from applications. Since hardware RAID does the parity computations on a dedicated processor, it does not hinder application performance.

Though hardware RAID has the advantage in performance, it is much more expensive and complicated to implement. Thus, it is desirable to have a software RAID solution that would give software RAID a level of performance that is closer to, equal or greater than hardware based RAID.

BRIEF DESCRIPTION OF THE DRAWINGS

The present invention will be described by way of exemplary embodiments, but not limitations, illustrated in the accompanying drawings in which like references denote similar elements, and in which:

FIG. 3 illustrates the operations of a prior art system utilizing software RAID;

SUMMARY OF THE INVENTION

Figure 1:
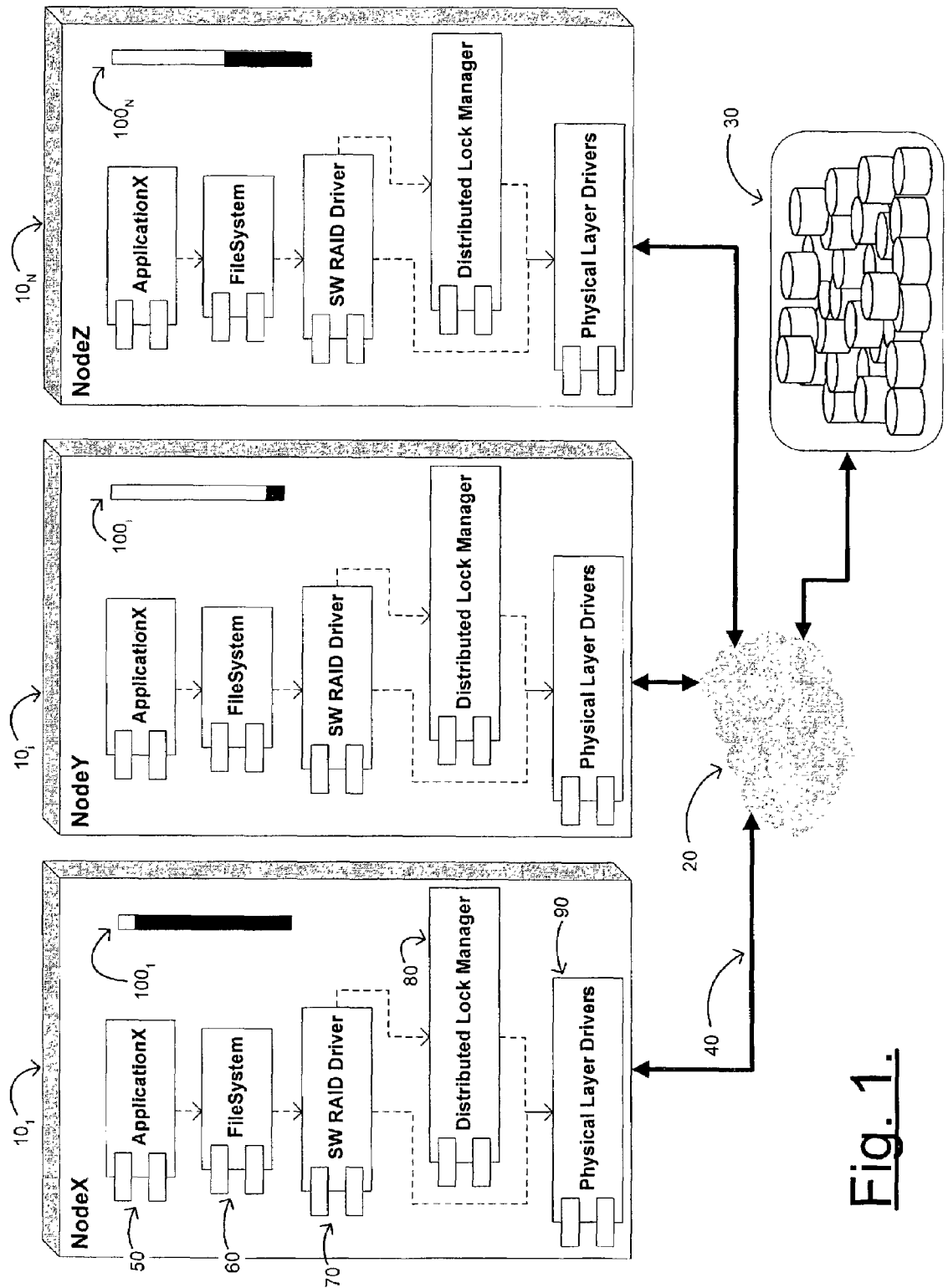
FIG. 1 illustrates a system utilizing software RAID, suitable for the practice of the present invention.

Briefly, the present invention includes at least a first and a second server of a cluster of servers being equipped with complementary software RAID drivers and distributed lock managers that enable the first server to delegate to the second server, writing of a version of a unit of coherent data into a number of storage devices coupled to the server cluster. The drivers and lock managers are designed to enable the first server to determine whether the second server is an appropriate current synchronization server target, which determination includes consideration of the last synchronization server target. If the last synchronization server target is not the appropriate current synchronization server target, the second server is selected among other servers of the cluster, which selection may be limited to a subset of eligible servers of the cluster.

In accordance with one aspect of the present invention, the consideration/selection may include the usage states of the candidate servers. Usage state of a candidate server may be measured with composite usage indicia based on a number of resource utilizations of the candidate server. The composite usage indicia may be periodically calculated and exchanged by the servers to facilitate local analysis.

In accordance with another aspect of the present invention, a delegating server may also replicate for yet another server, its version of a unit of coherent data that is the subject of a delegated write, the another server being a server wanting to read the unit of coherent data.

In accordance with another aspect of the present invention, in performing a delegated write, the delegated server may obtain at least a shared read lock on the unit of coherent data and validate a timestamp of the version of the unit of coherent data to be written. The delegated server may also notify one or more other servers to cancel any scheduled write, the one or more other servers may have for their versions of the unit of coherent data.

In accordance with another aspect of the present invention, the delegating server may re-assume the writing of the version of the unit of coherent data, e.g. in the event of a "failure" of the delegated server. The writing may include updating a write timestamp of the unit of coherent data and invalidating one or more replicated copies of the version of the unit of coherent data on one or more other servers.

DETAILED DESCRIPTION OF EMBODIMENTS

In the following description, various embodiments of the present invention will be described. For purposes of explanation, specific numbers, materials and configurations are set forth in order to provide a thorough understanding of the present invention. However, it will be apparent to those skilled in the art that the present invention may be practiced with only some of these details, and/or with other elements. In other instances, well-known features are omitted or simplified.

Terminology

Parts of the description will be presented in data processing terms, such as data blocks, request, lock, replicate, read, write and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having", "including" and other constructs of the like, are synonymous, unless the context dictates otherwise.

Example Computing Environment

We refer now to FIG. 1, wherein an example computing environment including cluster of servers equipped with software RAID suitable for practicing the present invention, is shown. As illustrated, the example computing environment includes a cluster of N servers $10_1 \ldots 10_N$ are interconnected 40 to each other and a plurality of storage devices 30 via a storage area network 20, N being an integer. The storage area network (SAN) may be implemented using any interconnect medium and protocol, such as Fiber channel and Ethernet/IP. Each server $10_i$ is a node in the cluster.

Server $10_1$ runs one or more applications 50, such as a database or a web server. These applications utilize the services of a file system 60. The file system 60 may e.g. be installed on a logical volume. The file system 60 is complemented by the software RAID driver 70, incorporated with the teachings of the present invention. The software RAID driver 70 uses hardware drivers 90 to access the storage devices 30. The software RAID driver 70 is complemented by distributed lock manager 80 incorporated with the teachings of the present invention. As will be described in more detail below, distributed lock manager 80 is advantageously provider with facilities for maintaining coherency among replicas of objects. It provides object level synchronization and fault tolerance services needed by the software RAID driver 70.

Server $10_1$ runs one or more applications 50, such as a database or a web server. These applications utilize the services of a file system 60. The file system 60 may e.g. be installed on a logical volume. The file system 60 is complemented by the software RAID driver 70, incorporated with the teachings of the present invention. The software RAID driver 70 uses hardware drivers 90 to access the storage devices 30. The software RAID driver 70 is complemented by distributed lock manager 80 incorporated with the teachings of the present invention. As will be described in more detail below, distributed lock manager 80 is advantageously provided* with facilities for maintaining coherency among replicas of objects. It provides object level synchronization and fault tolerance services needed by the software RAID driver 70.

Hereinafter, for ease of understanding, the description will focus primarily on the participating servers (again, those who participate in the write delegation of the present invention), referring to them simply as "nodes" or "servers" (without the adjective "participating") as if they are the only nodes or servers of the cluster. Those skilled in the art will appreciate that the present invention may be practiced in clusters with some or all of the servers participating in the write delegation.

Continuing to refer to FIG. 1, at any instant in time, each server $10_i$ is running at some percent of capacity, also known as its usage level or just usage. This is depicted by the vertical bar graph $100_i$. Server $10_1$ is shown running at 90%, server $10_i$ is shown running at 10%, and server $10_N$ is shown running at 50%. These numbers can vary chaotically with time, and it is typical for some servers to be more heavily used on an average basis than others. It's also typical to have standby nodes in the cluster that are idle most of the time.

An embodiment of the invention advantageously redirects the CPU intensive storage device write operations to the more lightly used nodes within the cluster for execution at some later optimum time. Resultantly, the RAID write latency typically associated with prior art software RAID is reduced, and at times even eliminated.

An embodiment of the present invention provides logic to detect the usage level of all the nodes in the cluster and communicate the usage levels to all the distributed lock managers in the cluster. The distributed lock managers incorporate logic to locally adjust their fault tolerance algorithms such that replication of state and data information necessary for storage device write operations may then be redirected or delegated to the more lightly used nodes within the cluster.

An additional benefit of the write redirect or delegation method is that fault tolerant write caching is now possible with host based RAID. Since a copy of volatile data exists on at least 2 nodes, a failure of a node can now be tolerated, even if volatile data exists. A surviving node can complete the write to disk of the volatile data.

In summary, the load redirecting/delegation strategy of the present invention allows the lightly used nodes to now perform useful work by handling the processing of RAID parity update calculations. CPU intensive write operations that were limiting the performance of software based RAID are now offloaded from a busy server onto lightly used servers thus significantly improving the overall performance of software RAID.

Except for the teachings of the present invention endowed to software RAID drivers and distributed lock managers, the elements of FIG. 1 are generally known in the art. Any number of implementations may be employed for these elements. Accordingly, these elements will not be further described. The teachings of the present invention provided to software RAID drivers and distributed lock managers will be described in further detail below.

Control Data Structure

Figure 2:
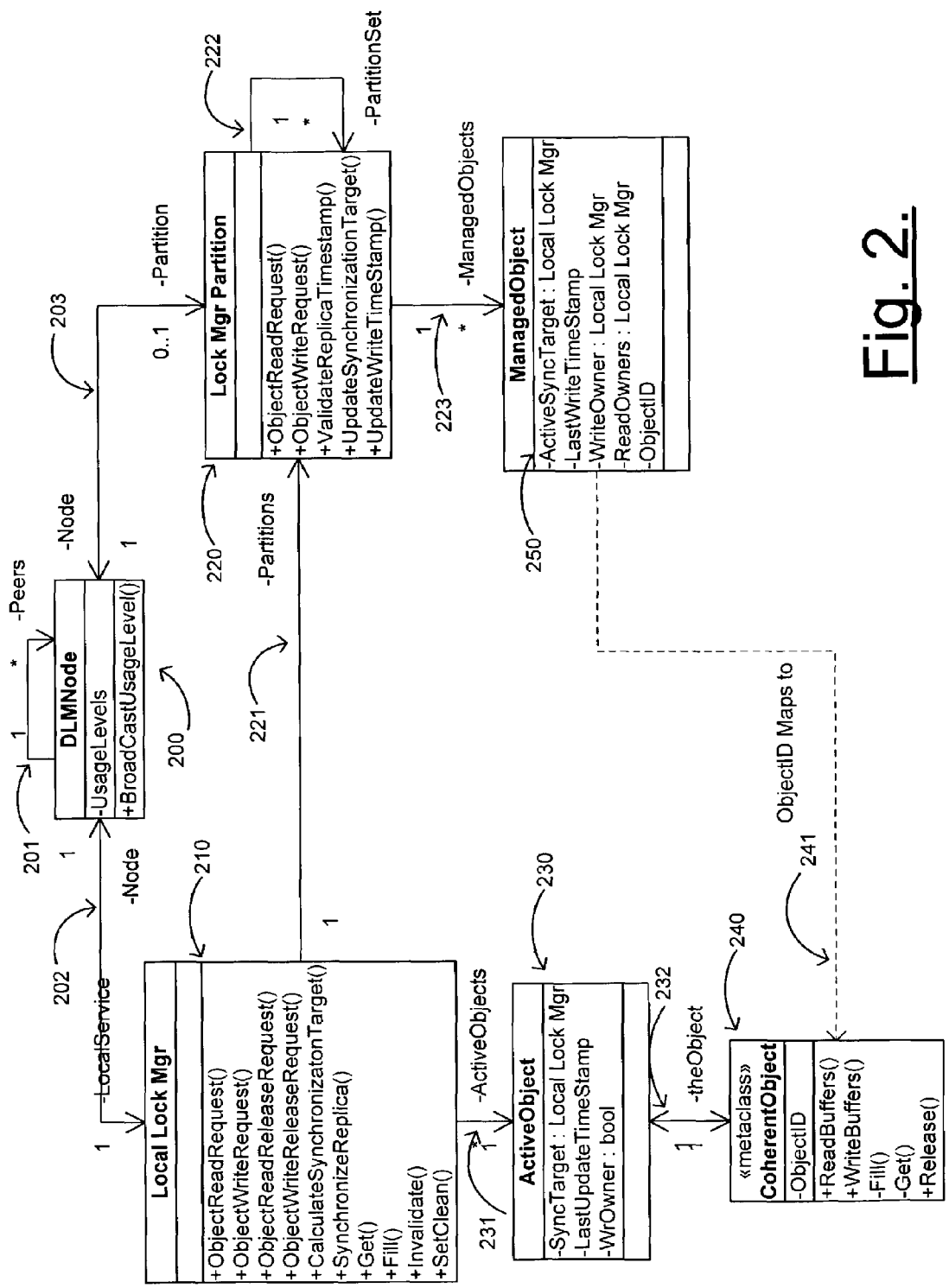
FIG. 2 is a class diagram showing selected classes of a distributed lock manager of FIG. 1, in accordance with one embodiment.

FIG. 2 shows the static control structure of the major classes of the distributed lock managers. Distributed lock managers (DLM) generally are well known in prior art.

However, in accordance with the present invention, they are further endowed with object replication management capabilities.

A cluster is composed of a multiplicity of DLMNodes 200. Each node has a usage level attribute. The usage level is a measure of how loaded the processor of that node is. In various embodiments, the usage level attribute is a composite usage indicia, computed based on combinations of resource utilizations, such as percentage of processor utilization, memory utilization, network bandwidth utilization, or some internal resource utilization. The combination may be weighted, linearly or non-linearly.

The usage level of any node may be periodically broadcast via messages to all the other nodes in the cluster. Usage level may also be a time filtered quantity. Many filtering algorithms are possible, but a typical implementation would be an average over a fixed time interval.

Each node has an instance of a Local Lock Manager 210 which is responsible for managing the lock and replica status information 230 of the objects 240 in active 231 use on that node.

There are 2 or more instances of the Lock Mgr Partition 220 within a cluster. These components manage global state used by all Local Lock Managers 210. A partition distributes global lock and replica state information 250 across M nodes in the cluster for the purposes of balancing lock and replica management overhead, M being also an integer. A typical distribution algorithm is a simple hashing algorithm based on some property of the object 240, typically an ObjectID.

A coherent object 240 is an object that must maintain synchronization and coherency within the cluster. Examples of Coherent Objects in a RAID application are data blocks, stripes, map tables, state tables, and cache data (each of which may be referred to as a unit of coherent data).

The ActiveSyncTarget property in the ManagedObject 250 is a reference to a Local Lock Manager that last received a replica of the object 240. This is maintained as a performance optimization to help direct new writes to the same node repeatedly, maximizing write caching effects.

The LastWriteTimeStamp property in the ManagedObject 250 is the time at which the object 240 was last written to the storage devices 30. For example if the object 240 is a buffer for a set of disk blocks then when the disk blocks are written to the physical disks this LastWriteTimeStamp property 250 will be updated. This property exists to handle the infrequent case of multiple replicas for the same object 240 existing on different nodes 210 within the cluster. The use of this property will be explained later with references to FIG. 4.

The SyncTarget property of the ActiveObject 230 references the node 210 to which replicas of object 240 write data should preferably be sent. It exists as an optimization to maximize write caching effects for replicas. This property will be explained further also with references to FIGS. 4 and 5.

The LastUpdateTimeStamp of the ActiveObject 230 is the time at which the object 240 was last written with new data. This property is used during writes to the storage devices 30. It is reconciled with the LastWriteTimeStamp property of the ManagedObject 250 to ensure that old object 240 replicas never overwrite newer object 240 data.

The WrOwner Flag of the ActiveObject 230 signals that it has write lock and is write able.

In alternate embodiments, other data structures may be employed to organize and hold the relevant control information.

Prior Art Write

FIG. 3 shows an embodiment of distributed RAID according to the prior art. This can be contrasted and compared to the embodiment of distributed RAID according to the invention shown in FIG. 4.

FIG. 3 shows four 301–304, of M distributed RAID cluster nodes and two 310, 311 of N disk nodes. The software RAID drivers 320 on Nodes X 301 and Y 302 are writing to one or more blocks on a RAID stripe 321. The local 322 and cluster 325 lock managers collaborate to serialize access to the RAID stripe 321 blocks. Details of various lock management protocols are discussed in detail in the prior art. The embodiment of this invention is independent on the specific lock management protocol used and therefore locking schemes need not be discussed further.

The write sequence begins by the SW RAID driver getting a write lock on the stripe. These steps are 340, 341, 342, 343. After the software RAID drivers acquire a write lock they read the old data 360, 370 and then fill the buffers 350, 351 with the new data for the stripe 321 blocks. It then generates the new parity 380, 381. It then writes the new data 362, 372 and new parity 363, 373 to disk.

Various Read and Write Scenarios under Present Invention

Figure 4A:
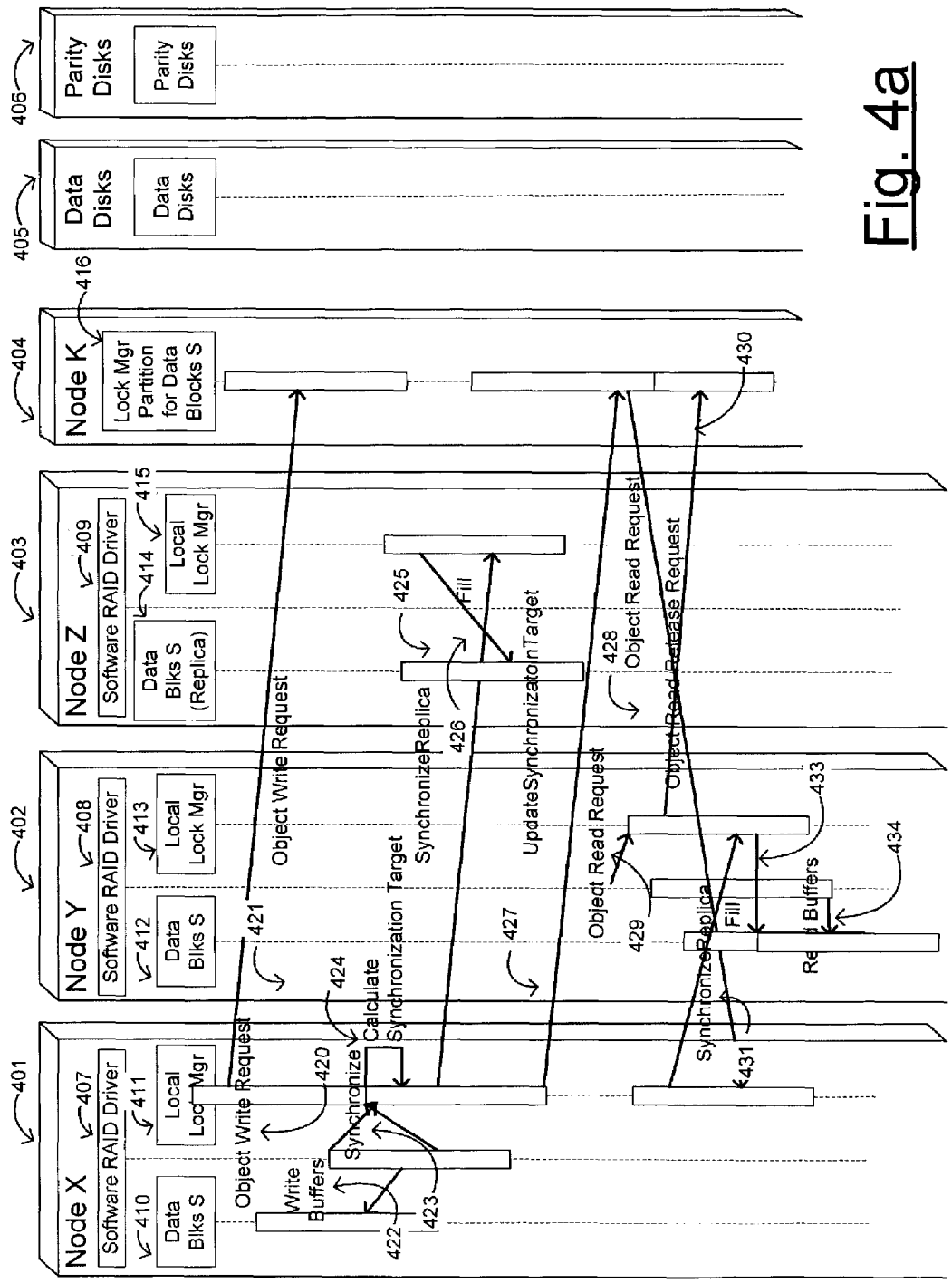
FIG. 4 (in 4 parts, 4*a*–4*d*) illustrates the operations of a system utilizing software RAID incorporated with the teachings of the present invention, in accordance with one embodiment.
Figure 4B:
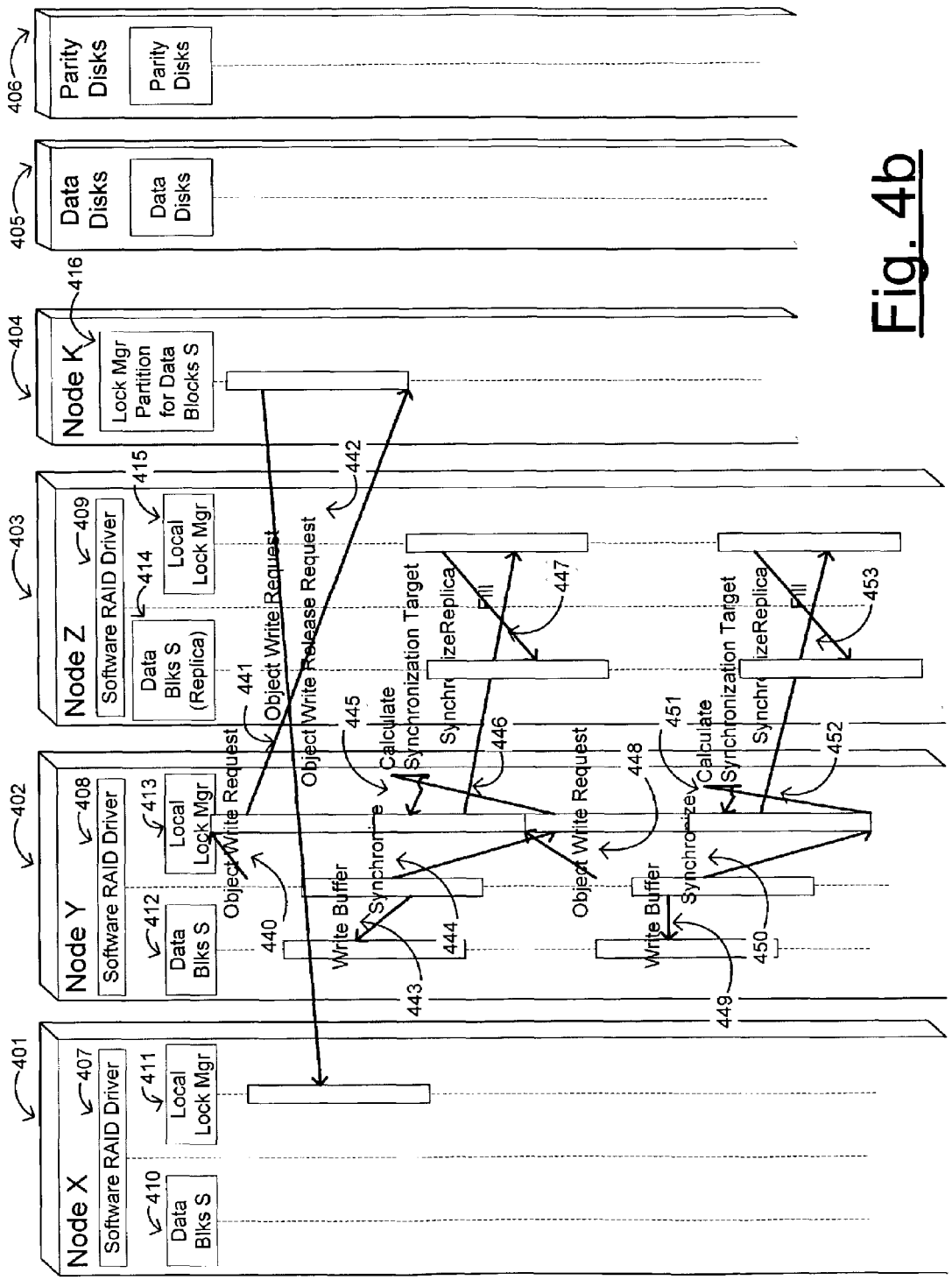
Figure 4C:
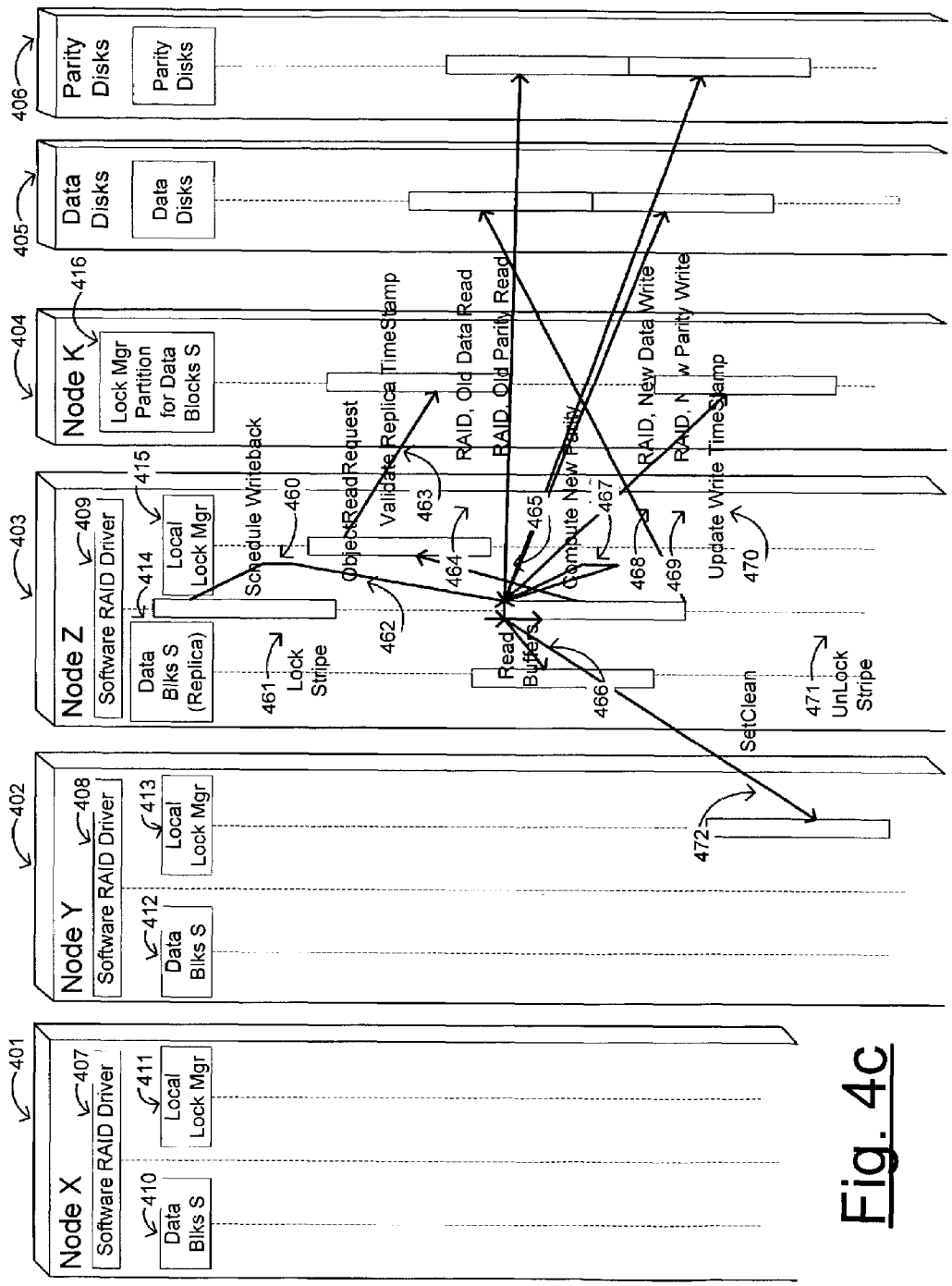
Figure 4D:
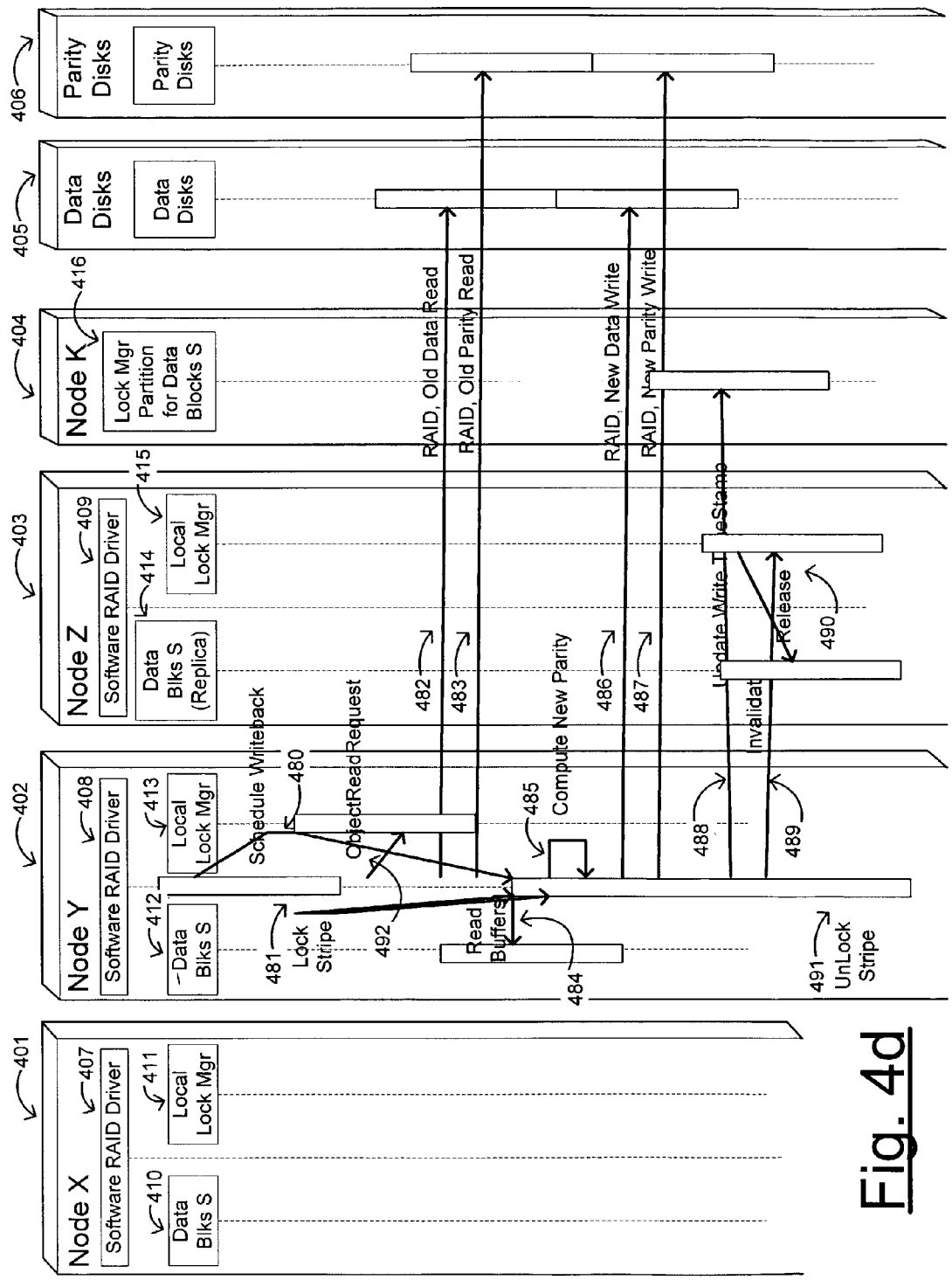

FIGS. 4a, 4b, 4c are all successive timeline diagrams, that is, 4b begins after 4a, and 4c begins after 4b. FIGS. 4a, 4b, 4d are also considered successive timelines. The timeline flow is then 4a→4b→(4c or 4d).

FIG. 4a shows four 401–404, of M distributed RAID cluster nodes and two 405, 406 of N disk nodes. The software RAID drivers 407, 408 on Nodes X 401 and Y 402 are writing to one or more data blocks sets S (example of a unit or units of coherent data). The data block sets are effectively cached on each node.

The buffers are allocated and managed the Coherent Object 240. 410, 412, 414 depict the buffers on their respective nodes for the data block set S.

The local lock managers 411, 413 and partition lock managers 416 collaborate to serialize access to the data blocks 410. Details of various lock management protocols are discussed in detail in the prior art. The embodiment of this invention is independent on the specific lock management protocol used and therefore locking schemes need not be discussed further.

The write sequence begins by the software (SW) RAID 407 driver acquiring a write lock on the data blocks 410. These steps are 420, 421. The lock step 421 returns a reference to a Local Lock Manager 415 to which a replica of the incoming data blocks should be written. This reference is called the synchronization server target, and is saved as a property in the Active Object 230. This Partition Lock manager 416 returns this value from the ActiveSyncTarget property of the ManagedObject 250 corresponding to the data blocks 410. The synchronization server target returned is typically the last Local Lock Manager to which a replica for the data blocks was written.

After the lock is acquired, the SW RAID driver 407 writes the incoming data to a local buffer 422 and issues a synchronization request 423 to the Local Lock Manager 411. The Local Lock Manager 411 calculates 424 the synchronization server target 415. It then synchronizes a replica 425 of the data blocks 410 with the synchronization target 403, 415. The synchronization involves the transmission of a copy of the data in the source buffer 410 to the target buffer 412.

If the calculated synchronization target 415 is different than the SyncTarget property of the ActiveObject 230 corresponding to the data blocks in buffer 410 then the Local Lock Manager 411 notifies 427 the Partition Lock Manager 416 of the change. The Partition Lock Manager stores this property as the ActiveSyncTarget in the ManagedObject 250 corresponding to the data blocks in buffer 410.

The SynchronizeReplica 425 operation can be rejected by the synchronization server target 415. In this case, the calling Local Lock Manager 411 must calculate a new synchronization server target 424, and retry the Synchronize Replica 425 step. The SynchronizeReplica 425 operation may be rejected for any reason, but typical reasons might be over utilization, offline status, or out of resources.

In the preferred embodiment, the UpdateSynchronizationTarget 427 operation is delayed, asynchronous with respect to the ObjectWriteRequest 420. This implies it does not impact the response time for the ObjectWriteRequest 420.

Operation 429 shows the start of a case where the software RAID driver 408 on another node 402 needs to read the data blocks that were written previously. The software RAID driver 408 obtains a lock on the data blocks by requesting a object read 429 to the Local lock Manager 413, which in turn requests read lock from the partition lock manager 416 for the data blocks.

The partition lock manager 416 is aware that another node 401 currently has an exclusive write lock on the data blocks. It requests the current lock owner 411 to demote its lock from exclusive write to shared read. The current lock owner 411 then synchronizes a replica of the data blocks with the new read owner 413, which in turn fills 433 the data buffers for the data blocks. After the read lock is granted, the software RAID driver 408 can now read the data blocks.

FIG. 4b shows 2 successive writes to the data blocks in buffer 410 by node Y 402. The first write requires a lock management operation to change the lock status from shared read to exclusive write. The local Lock managers 411 and 413 are sharing read access to the data blocks and 413 requires exclusive write access.

The first write begins with an ObjectWriteRequest 440, 441. The PartitionLockManager 416 then issues an ObjectWriteReleaseRequest 442, which directs the other Local Lock Manager 411 with a shared read lock to release its lock and invalidate its copy of the data blocks 410. After the lock is granted, the software RAID driver 408 writes the buffers for the data blocks. It then issues a synchronization request 444. The synchronization process then proceeds as in 423. The second write on FIG. 4b begins with an ObjectWriteRequest 448. This write does not require a lock acquisition because node 413 already has the exclusive write lock, which was acquired in the first write. The second write then progresses as in 443.

FIGS. 4c and 4d show the delayed write to storage devices 30. This is typically referred to as a 'write back' operation. FIG. 4d shows the writeback as done by the node 402 with the working instance in buffer 412 of the data blocks; whereas FIG. 4c shows the writeback done by the node 403 with the replica in buffer 414 of the data blocks. The sequences for both cases are very similar with 462 and 463 being the major differences.

At some point in time after the writes in FIGS. 4a and 4b, actual writebacks to storage devices 30 will be scheduled 480, 460. The scheduling algorithm in general is such that software RAID driver 409 on the node with the replica 414 should do the writeback most of the time under most circumstances. The primary exception will be the case when the node 403 with the replica in buffer 414 fails. In that case, the working copy in buffer 414 will be written back to storage devices 30 by software RAID driver 408. The details of the scheduling algorithm are not fundamental to the invention. LRU(least recently used), timestamp aging, as well as other techniques may be employed.

Once the writeback operation is started, the software RAID driver 408, 409 secures an exclusive write lock 461, 481 on the stripe. The software RAID driver executing the writeback then issues an ObjectReadRequest 462, 492. For the software RAID driver 408 with the working instance in buffer 412, the request is immediately granted, because at a minimum it must have at least shared read access to the data blocks in buffer 412. For the software RAID driver 409 with the replica the Local Lock. Manager 415 sends the LastUpdateTimestamp Property 230 for the data blocks in buffer 414 to the PartitionLockManager 416 for validation.

To validate the timestamp, the PartitionLockManager 416 compares the received LastUpdateTimestamp 230 to the LastWriteTimeStamp property of the corresponding ManagedObject 250. If the received LastUpdateTimestamp 230 is earlier than the LastWriteTimeStamp of the corresponding ManagedObject 250, the validation fails. If the ValidateReplicaTimestamp 463 fails, the writeback is aborted, and the buffer 414 is invalidated and released.

Once the ObjectReadRequest 462, 492 is granted, then basic RAID operations are carried out. The old data 464, 482 and old parity 465, 483 are read from the corresponding ones of storage devices 30, 405, 406. The data block buffer is read 466, 484, and the new parity is computed 467, 485. The new data 468, 486 and the new parity 465, 487 are written to their corresponding disks 405, 406. Then, the LastWriteTimeStamp 250 is updated 470, 488 with the LastUpdateTimestamp 230 to ensure that future writes do not write older replicas over newer data.

If the software RAID driver executing the writeback is on the node 403 with the replica in buffer 414, it further signals 472 the Local Lock Manager 413 on the node with the working copy in buffer 412 to mark its copy in buffer 412 as clean, so that no redundant writebacks are scheduled. In one embodiment, the SetClean signal 472 is a delayed, asynchronous message that does not add to the duration of the writeback operation.

If the software RAID driver executing the writeback is on the node 402 with the working copy in buffer 412 then it invalidates 489 the replica in buffer 414 to free up 490 any memory resources and prevent unnecessary future writebacks. In one embodiment, this invalidate 489 signal is a delayed, asynchronous message that does not add to the duration of the writeback operation. The writeback concludes with the release of the stripe lock 471, 491.

Advantage of the Invention

FIGS. 3 and 4 can be compared to see the benefits of the invention. In the prior art, Node X 301 incurs the overhead, and latency of 4 disk operations 360–363. In the invention, the corresponding write sequence by Node X 401 would only require the overhead and latency of 1 lock management 421 and 1 synchronization operation 425. In the case where the lock is already held, the overhead is even further reduced to just 1 synchronization 452 operation.

Synchronization Server Target Selection

Figure 5:
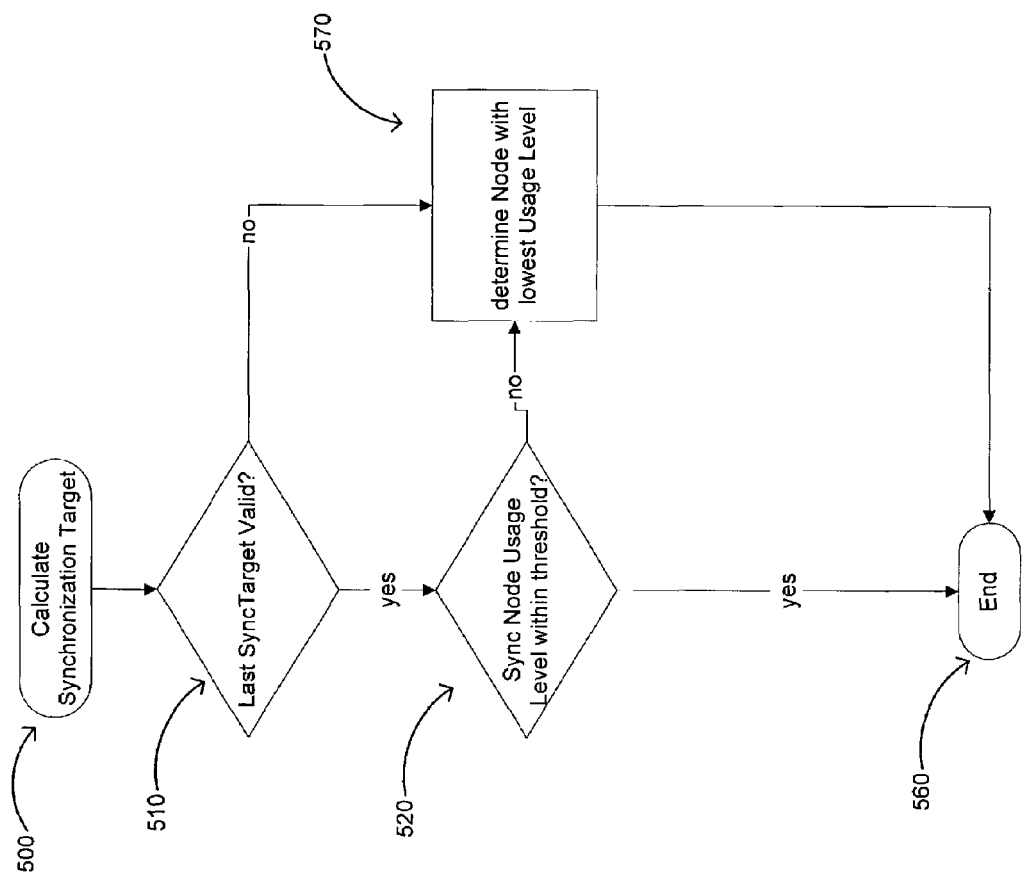
FIG. 5 illustrates the operational flow of the software RAID driver for calculating a synchronization server target, in accordance with one embodiment.

FIG. 5 shows the flowchart for the algorithm used in 424, 445, 451 to calculate the synchronization target. The algorithm starts 500 by determining if the SyncTarget 230 for the object to be synchronized is valid. This property is usually returned from the Partition Lock Manager. If the object to be synchronized has not been synchronized within some recent time interval then this value may not be valid and a new SyncTarget will be chosen 570.

If the SyncTarget 230 is valid then a check 520 is made to make sure the usage level of the node corresponding to the SyncTarget is still below an acceptable ceiling. If the usage level exceeds this range then a new SyncTarget will be chosen 570. A new node is chosen by simply picking the node with the lowest usage level from a set of allowable SyncTargets. Not all nodes in the system need to be allowed to become SyncTargets. In many embodiments, it may be preferable to have a subset of nodes handle Synchronization requests 425. An example is some reserve capacity nodes that do not actively service application 50 requests. Another example is to limit the candidate synchronization targets to servers of the same fault domains.

CONCLUSION AND EPILOGUE

Thus, it can be seen from the above descriptions, various novel software RAID methods and apparatuses have been described.

While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In a computing environment having a cluster of servers and a plurality of storage devices, a method of operation, comprising:
    a first of said cluster of servers having a need to write a first version of a unit of coherent data into said plurality of storage devices determining whether a valid second version of the unit of coherent data is replicated on a second of the said cluster of servers as a result of a preceding delegated write operation; and
    the first server conditionally replicating the first version of the unit of coherent data on a selected one of said second and a third of said cluster of servers, based at least in part on the result of said determination, to delegate to the selected one of said second and third servers, the writing of the first version of the unit of coherent data into the plurality of storage devices.

2. The method of claim 1, wherein the method further comprises
    a lock manager of the first server requesting a partition lock manager for a write lock on the unit of coherent data; and
    the partition lock manager, in response, identifying for the lock manager of the first server, the second server as having the valid second version of the unit of coherent data by virtue of the fact that the second server is a last synchronization server target of a last delegated write operation.

3. The method of claim 2, the method further comprises the partition lock manager learning of the second server being the last synchronization server target, by examining an active synchronization server target property of a control object corresponding to the unit of coherent data.

4. The method of claim 1, wherein said second server is a last synchronization server target of a last delegated write operation of the coherent unit of data, and said determining comprises determining whether said second server continues to consider the second version of the unit of coherent data as active.

5. The method of claim 4, wherein the method further comprises the second server maintaining the second version of the unit of coherent data as a valid active object if the second server continues to consider the second version of the unit of coherent data as active; and
    said determining of whether said second server continues to consider the second version of the unit of coherent data as active comprises determining whether the unit of coherent data is among the valid active objects maintained by the second server.

6. The method of claim 4, wherein the method further comprises the first server further determining whether the second server is an eligible synchronization server target based at least in part on a current usage level of the second server, if it is determined that the second server contains the valid second version of the unit of coherent data.

7. The method of claim 6, wherein said determining of whether the second server is an eligible synchronization server target based at least in part on a current usage level of the second server comprises the first server examining a usage indicia of the second server, and determining whether the usage indicia is below a predetermined threshold.

8. The method of claim 7, wherein said examining of the usage indicia comprises the first server examining a local copy of the usage indicia, and the method further comprises each of the cluster of servers periodically providing each other with its usage indicia, and maintaining local copies of the received indicia.

9. The method of claim 8, wherein said usage indicia is a composite usage indicia computed from a plurality of resource utilizations, and the method further comprises each of the cluster of servers periodically computing its own composite usage indicia.

10. The method of claim 6, wherein the method further comprises identifying said third server if it is determined that the second server is not an eligible synchronization server target, the third server being identified based at least in part on the relative current usage levels of the cluster of servers, excluding the second server.

11. The method of claim 10, wherein the third server is also identified based at least in part on its membership of an eligible synchronization server target group.

12. The method of claim 4, wherein the method further comprises identifying said third server if it is determined that the second server no longer considers the second version of the unit of coherent data as active, the third server being identified based at least in part on the relative current usage levels of the cluster of servers, excluding the second server.

13. The method of claim 12, wherein the third server is a selected one of the first server and a member of an eligible synchronization server target group.

14. The method of claim 1, wherein the method further comprises the selected one of the second and third servers writing the first version of the unit of coherent data into the plurality of storage devices at a subsequent point in time.

15. The method of claim 14, wherein said writing of the first version of the unit of coherent data into the plurality of storage devices comprises
    reading a prior version of the unit of coherent data and its corresponding parity data;
    computing a new parity value for the first version of the unit of coherent data to be written;

RAID writing the first version of the unit of coherent data to be written and the computed new parity value; and updating a partition lock manager with a new write timestamp for the unit of coherent data.

16. The method of claim 14, wherein said writing of the first version of the unit of coherent data into the plurality of storage devices comprises invalidating another replicated version of the unit of coherent data on another server.

17. The method of claim 1, wherein the method further comprises
a fourth of the cluster of server requesting a partition lock manager for read lock on the unit of coherent data;
the partition lock manager in response informing the first server of the request, and requesting the first server to demote its write lock on the unit coherent data to a shared read lock;
the first server in response demoting the lock as requested, and replicating a copy of the first version of the unit of coherent data on the fourth server.

18. The method of claim 1, wherein the unit of coherent data is a selected one of a data block, a data stripe, a map table, a state table and a unit of cached data.

19. In a first server of a cluster of servers coupled to each other and to a plurality of storage devices, a method of operation, comprising:
obtaining a write lock for a unit of coherent data, a first version of the unit of coherent data is to be written into the plurality of storage devices;
receiving a last synchronization server target;
determining whether the last synchronization server target is to be selected as a current synchronization server target;
selecting the last synchronization server target as the current synchronization server target, if it is to be selected;
replicating the first version of the unit of coherent data on the selected current synchronization server target to delegate to the selected current synchronization server target the writing of the first version of the unit of coherent data into the plurality of storage devices.

20. The method of claim 19, the method further comprises selecting a second other server of the cluster as the current synchronization server target if it is determined that the last synchronization server target is not to be selected as the current synchronization server target.

21. The method of claim 20, wherein the second other server is a member of an eligible synchronization server target group.

22. The method of claim 19, wherein the method further comprises
demoting the obtained write lock to a shared read lock; and further replicating the first version of the unit of coherent data on a second server of the cluster, the second server being a server wanting to read a current version of the unit of coherent data.

23. The method of claim 19, wherein the method further comprises
reading a prior version of the unit of coherent data and its corresponding parity data;
computing a new parity value for the first version of the unit of coherent data to be written;
RAID writing the first version of the unit of coherent data and the computed new parity value into the plurality of storage devices; and
updating a partition lock manager with a new write timestamp for the unit of coherent data.

24. The method of claim 23, wherein the method further comprises invalidating another replicated version of the unit of coherent data on another server.

25. The method of claim 19, wherein the method further comprises computing a usage indicia of the first server, and providing the computed usage indicia to the other servers of the cluster.

26. The method of claim 25, wherein the usage indicia is a composite usage indicia, and said computing comprises computing the composite usage indicia of the first server based on a plurality resource utilizations of the first server.

27. A cluster of servers comprising:
a first server having a first software RAID driver and a first distributed lock manager operationally coupled to each other to identify a coupled second server as a last synchronization server target, determine whether the second server is to be selected as a current synchronization server target, and if the second server is selected as synchronization server, replicate a first version of a unit of coherent data on the second server to delegate to the second server, writing of the first version of the unit of coherent data into a plurality of storage devices coupled to the cluster of servers; and
the second server, having a second software RAID driver and a second distributed lock manager operationally coupled to each other to receive from the first server a replicated copy of the first version of the unit of coherent data, and subsequently perform the delegated write for the first server.

28. The server of claim 27, wherein both the first and second software RAID drivers are further designed to periodically compute respective usage indicia of the first and second servers, and notify each other of the computed result.

* * * * *